United States Patent [19]
Citta et al.

[11] Patent Number: 5,113,256
[45] Date of Patent: May 12, 1992

[54] METHOD OF PERCEPTUALLY MODELING A VIDEO IMAGE SIGNAL

[75] Inventors: Richard W. Citta, Oak Park; Stephen M. Dicke, Wheeling, both of Ill.

[73] Assignee: Zenith Electronics Corporation, Glenview, Ill.

[21] Appl. No.: 653,560

[22] Filed: Feb. 8, 1991

[51] Int. Cl.⁵ ............................................. H04N 7/13
[52] U.S. Cl. ................................. 358/133; 358/136; 382/56
[58] Field of Search ............... 358/133, 138, 160, 136; 382/14, 15, 36, 56

[56] References Cited

U.S. PATENT DOCUMENTS 4,774,574  9/1988  Daly et al. ................... 358/138 X
4,780,761  10/1988  Daly et al. ................... 358/138 X
4,802,232  1/1989  Altes .............................. 382/36 X
4,959,870  9/1990  Tachikawa ....................... 382/56

Primary Examiner—Victor R. Kostak

[57] ABSTRACT

A video image signal is transform coded to derive a plurality of blocks of transform coefficients, the coefficients of each block being separated into horizontal, vertical and diagonal spatially related regions. A plurality of values each representing the degree to which a portion of the video image is characterized by a respective image related perceptual characteristic are derived in responsee to the estimated energy in the three regions. The derived perceptual values are combined and weighted to provide a single output value corresponding to each coefficient block.

23 Claims, 4 Drawing Sheets

METHOD OF PERCEPTUALLY MODELING A VIDEO IMAGE SIGNAL

CROSS-REFERENCE TO RELATED APPLICATION

This application is related to copending application Ser. No. 07/539,770, filed Jun. 18, 1990, entitled Video Transmission System Using Adaptive Sub-band Coding, in the names of Richard W. Citta and Stephan M. Dicke, which application is assigned to the assignee of the present invention.

BACKGROUND OF THE INVENTION

The present invention relates to a system for perceptually modeling a video signal which has particular utility in controlling the operation of a variable quantizer for compressing a video-related signal.

Numerous techniques have been proposed for compressing a wide band video signal to enable its transmission through a channel of limited bandwidth, such as a standard 6 MHz television channel. See, for example, the article by Paul A. Wintz entitled, "Transform Picture Coding" in the Proceedings of the IEEE, Vol. 60, No. 7, pages 809-820, Jul., 1972. Prior art video compression systems typically employ a variable quantizer for effecting bandwidth compression by variably quantizing the transform coefficients of a video-related signal, which signal may represent, for example, the complete video image or just a portion thereof, e.g. a temporally derived difference signal. In any case, compression of the video related signal may be effected by quantizing the transform coefficients using codes of variable bit-length corresponding to different levels of signal resolution. The use of a zero bit-length code may be considered a special case of this type of quantization wherein the corresponding transform coefficients are completely truncated.

Various techniques have been developed for controlling the variable quantization process, i.e. the algorithm employed for determining the bit-length or resolution to be used for representing the various transform coefficients. For example, it is relatively common to quantize the lower order coefficients with more resolution than the higher order coefficients, since low frequency video information is generally considered more important during image reproduction. Such a simplistic approach, however, may or may not provide optimum efficiency in every case. It has been found that quantization efficiency may be improved by controlling coefficient resolution in dependence upon the nature or perceptual characteristics of the video image itself. Due to the complexity of video images or portions of video images, which often comprise combinations of various different perceptual characteristics, accurately modeling or establishing the nature of such images is a particularly difficult task.

It is therefore a basic object of the present invention to provide a novel system for perceptually modeling a video image signal.

It is another object of the invention to provide a system for perceptually modeling a video image signal, which system takes into account the fact that the video image signal may comprise a combination of different perceptual characteristics.

It is a further object of the invention to provide a perceptual modeling system useful for controlling a process in which a video-related signal is variably quantized.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

Figure 1:
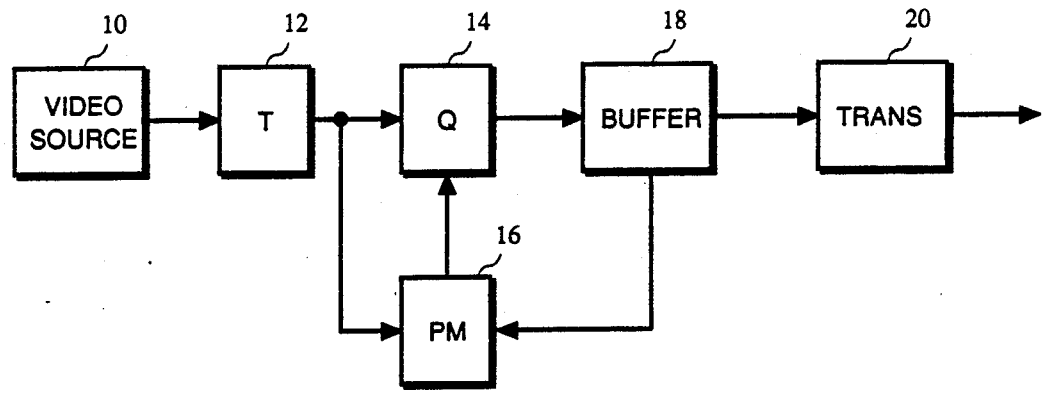
FIG. 1 is a block diagram of one embodiment of a video signal compression system with which the perceptual modeling techniques of the present invention may be employed.
Figure 2:
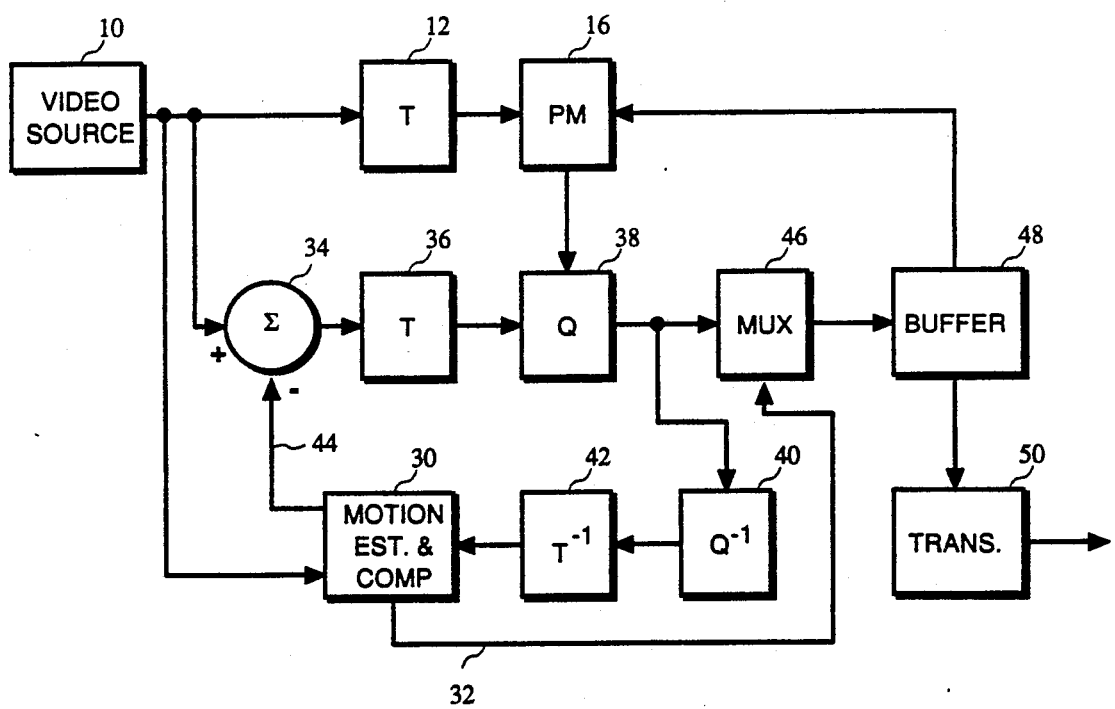
FIG. 2 is a block diagram of a second embodiment of a video signal compression system with which the perceptual modeling techniques of the present invention may be employed.

Two different video compression systems are shown in the block diagrams of FIGS. 1 and 2. These systems are exemplary of the type of video compression systems with which the perceptual modeling techniques of the present invention may be employed. In this regard, it is to be understood that the invention may be used with other forms of video compression systems and, in fact, with other forms of video processing systems, so that the particular systems shown in FIGS. 1 and 2 should not be viewed as to impose any unnecessary limitations on the invention.

Referring in more detail to FIG. 1, a video source 10 provides a wide band video signal which may have a bandwidth of up to about 37 MHz. Although not necessarily limited thereto, source 10 may provide, for example, a progressively scanned video signal in the form of successive frames of video data having a vertical periodicity equal to the NTSC standard and a horizontal periodicity equal to three times the NTSC standard. The video data is applied in the form of a stream of digital pixel values from video source 10 to a transform coder 12 which may, for example, implement a discrete cosine transform. More specifically, transform coder 12 processes the digital pixel values for providing a series of blocks of spectral transform coefficients for each frame of the video source signal, each block of coefficients corresponding to a respective spatial region of the image. In a presently preferred embodiment of the invention, each block comprises an (8×8) array of coefficients with 14,400 blocks representing an entire video frame.

The coefficient blocks developed by transform coder 12 are applied one at a time to a variable quantizer 14 and to a perceptual modeling system 16 constructed according to the invention. Variable quantizer 14 is operable for quantizing each coefficient of a respective block to a level of resolution determined in response to a control signal from perceptual model 16. For example, each coefficient may be quantized in response to the control signal using either a 0, 3, 5 or 7 average bit-length code, with a 0 bit-length code representing truncation of the corresponding coefficient. The quantized coefficients are then applied through a buffer 18 for transmission by a transmitter 20. Buffer 18 provides a feedback signal to perceptual model 16 as a function of the fullness of the buffer. Thus, as buffer fullness increases the extent of quantization may likewise be increased (i.e. more compression), and visa versa.

It will be appreciated that the system of FIG. 1 operates strictly in the spatial domain for effecting compression of the video source signal. The system of FIG. 2 effects compression by also operating in the temporal domain. In this embodiment, video source 10, transform coder 12 and perceptual model 16 may be identical to the corresponding elements in FIG. 1. The video data is not, however, transmitted in the form of blocks of variably quantized coefficients which are spatially related to the image, but rather in the form of a motion vector and a variably quantized difference signal. The motion vector identifies a closely matching block of video pixels from the previous frame and the difference signal represents the difference between the identified pixel block and the current pixel block. In particular, the video pixels developed by source 10 are applied to a motion estimation and compensation unit 30 which generates a motion vector on an output 32 identifying the pixel block of the previous frame most closely matching the current pixel block. The video pixels developed by source 10 are also applied through a subtraction unit 34 and a second transform coder 36 to a variable quantizer 38, which generates the difference signal at its output. The output of quantizer 38 is fed back through an inverse quantizer 40 and an inverse transform coder 42 to a second input of motion estimation and compensation unit 30.

Inverse quantizer 40 and inverse transform coder 42 are equivalent to corresponding circuits used to reconstruct the difference signal in the viewers' receivers. The output of inverse transform coder 42 thus represents the reconstructed difference signal which is combined in unit 30 with the block identified by the motion vector to derive a reconstructed pixel block. This reconstructed pixel block is applied over an output 44 of unit 30 to a second input of subtractor 34. Subtractor 34 subtracts the reconstructed pixel block from the current pixel block to derive the difference signal, which is then transform coded by coder 36 and variably quantized by quantizer 38. Variable quantizer 38 is operated under the control of perceptual model 16 in a manner similar to the operation of quantizer 14 in FIG. 1. However, in the case of quantizer 38, variable quantization of the transform coefficients representing the difference signal produced by subtractor 34 is effected rather than quantization of the coefficients representing the video signal as in the case of the FIG. 1 embodiment.

The variably quantized difference signal coefficients produced by quantizer 38 are combined with the motion vector produced by unit 30 in a multiplexer 46 and applied therefrom to an output buffer 48. Output buffer 48 generates a feedback signal for controlling perceptual model 16 in accordance with the fullness of the buffer in a manner similar to that explained in connection with the embodiment of FIG. 1. Finally, the multiplexed signal comprising the motion vector and quantized difference signal coefficients is applied by buffer 48 to a transmitter 50 for transmission over a selected television channel.

Figure 3:
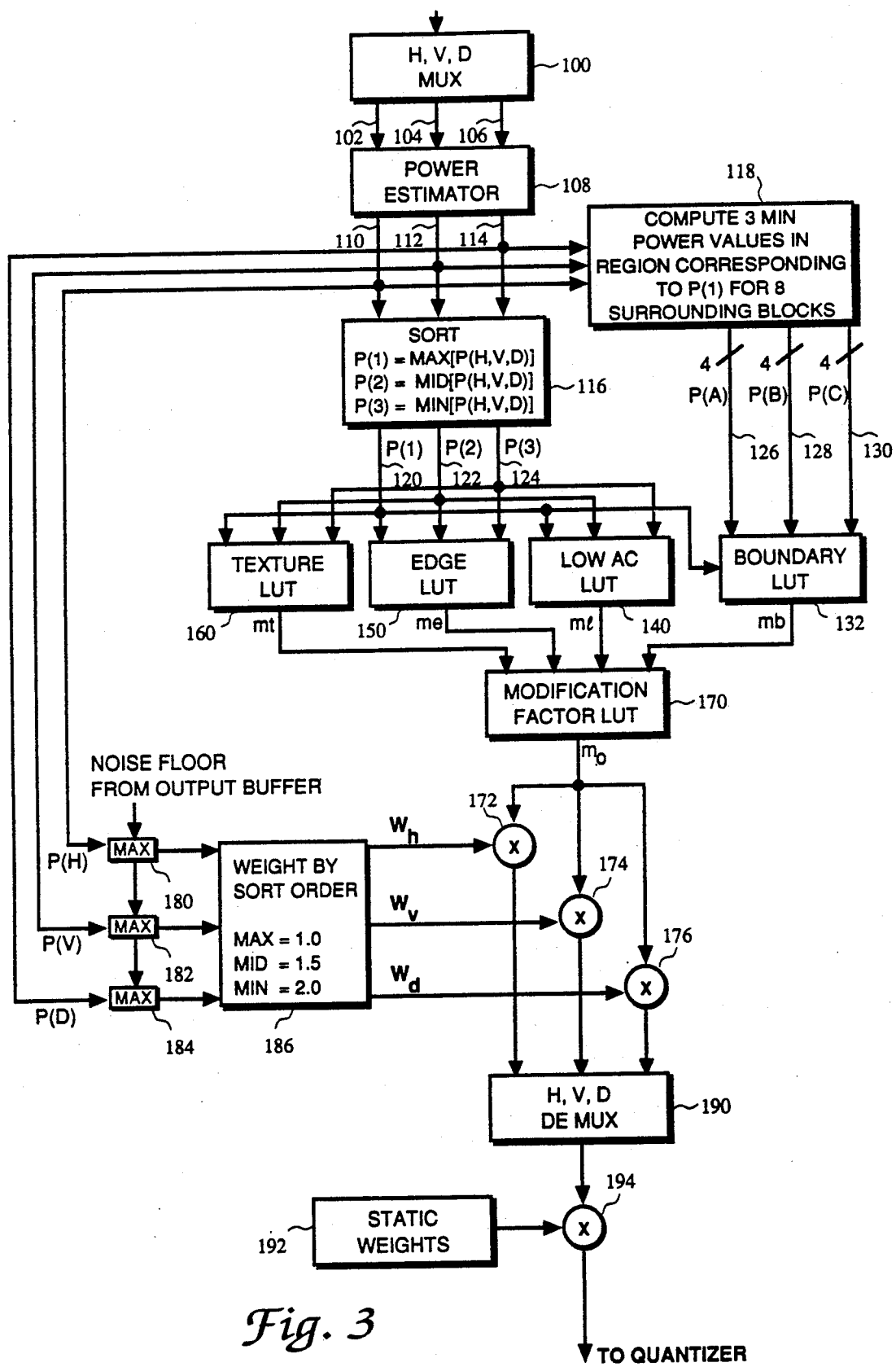
FIG. 3 is a block diagram illustrating the perceptual modeling system of the invention.

FIG. 3 is a block diagram of perceptual model 16 used to control variable quantizers 14 and 38 in the embodiments of FIGS. 1 and 2. As mentioned previously, it is contemplated, and thus within the scope of the present invention, to use perceptual model 16 to control video processors other than variable quantizers as specifically illustrated herein.

Figure 4:
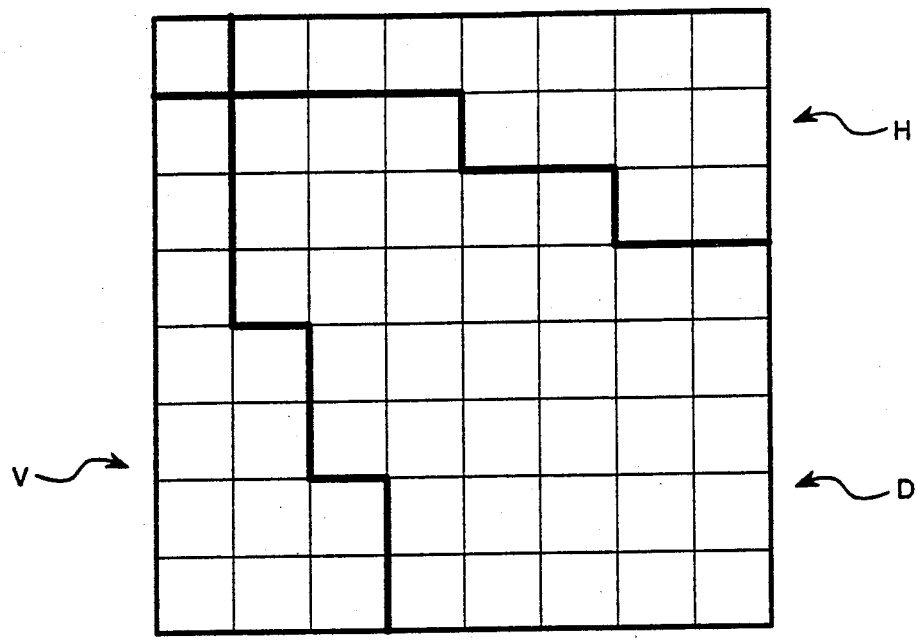
FIG. 4 is a graphical depiction of an (8x8) array of transform coefficients divided into horizontal, vertical and diagonal spatial regions.

Referring now in detail to FIG. 3, perceptual model 16 comprises an input multiplexer 100 for serially receiving the (8×8) coefficient blocks from transform coder 12. Multiplexer 100 separates the coefficients of each block into a plurality of spatially oriented subgroups as illustrated in FIG. 4. Thus, multiplexer 100 provides a first output 102 comprising the coefficients of region H which represent the horizontal frequencies of the corresponding portion of the video image, a second output 104 comprising the coefficients of region V which represent the vertical frequencies of the corresponding portion of the video image and a third output 106 comprising the coefficients of region D which represent the diagonal frequencies of the corresponding portion of the video image. The three outputs 102, 104 and 106 of multiplexer 100 are applied to a power estimation unit 108 which provides three outputs 110, 112 and 114 each comprising a signal representing the estimated energy in a respective one of the regions H, V and D. Output 110 thus comprises a signal P(H) representing the estimated energy of the coefficients in region H, output 112 a signal P(V) representing the estimated energy of the coefficients in region V, output 114 a signal P(D) representing the estimated energy of the coefficients in region D. Power estimation unit 108 may implement steps 100 and 102 of FIG. 8A of the referent copending application to derive the energy estimates P(H), P(V) and P(D). In particular, each regional energy estimation may be derived according to either of the expressions:

$$P(X) = \tfrac{1}{3} \sqrt{X(1)^2 + X(2)^2 + X(3)^2}, \qquad (1)$$

$$P(X) = \tfrac{1}{3} [X(1) + X(2) + X(3)], \qquad (2)$$

where X=H, V or D, and X(1), X(2) and X(3) are the magnitudes of the three largest coefficients in a respective region.

The three regional energy estimations P(H), P(V) and P(D) provided on outputs 110, 112 and 114 respectively are coupled to a sorting unit 116 and to a computation unit 118. Sorting unit 116 sorts the three regional energy estimations P(H), P(V) and P(D) according to magnitude, the largest being denoted as P(1) and provided on an output 120, the second largest as P(2) and provided on an output 122 and the smallest as P(3) and provided on an output 124. Computation unit 118 provides three values P(A), P(B) and P(C) on respective outputs 126, 128 and 130. These values represent the three smallest regional energy estimations of the region H, V or D corresponding to P(1) of the eight blocks immediately surrounding the currently processed block. In other words, if P(l) of the current block is P(H), P(A), P(B) and P(C) represent the three smallest energy estimations P(H) of the eight surrounding coefficient blocks.

The energy estimations P(1), P(2), P(3) and P(A), P(B), P(C) are next processed to determine the degree to which the coefficient block is characterized by each of a plurality of different perceptual characteristics. In the preferred embodiment of the present invention, these perceptual characteristics comprise boundary, low AC, edge and texture. The boundary characteristic is indicative of the extent to which the coefficient block represents a relatively distinct boundary between two separate portions of the video image, the low AC characteristic the extent to which the coefficient block represents relatively low total energy, the edge characteristic the extent to which the coefficient block represents video content in a single direction and the texture characteristic the extent to which the coefficient block represents video content in two directions. As will be seen hereinafter, the determination of the extent of these perceptual characteristics establish, in part at least, the level of quantization effected by variable quantizers 14 and 38 of FIGS. 1 and 2 respectively.

Figure 5:
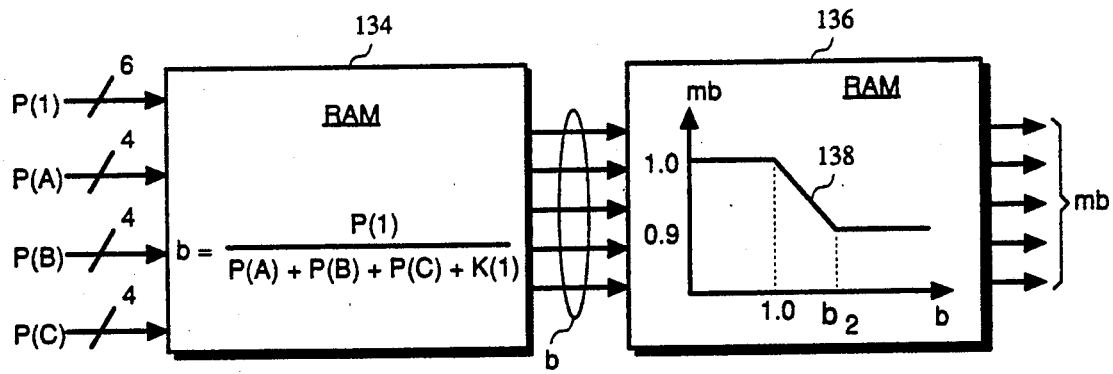
FIGS. 5-8 are block diagrams illustrating an implementation of the boundary, low AC, edge and texture LUT's respectively shown in FIG. 3.

The extent or degree to which the coefficient block is characterized by the boundary characteristic is reflected in a boundary characteristic value mb derived at the output of a boundary look-up table (LUT) 132 supplied with values P(A), P(B) and P(C) from computation unit 118 and value P(1) from sort unit 116. Referring to FIG. 5, boundary LUT 132 comprises a first memory in the form of a RAM 134 for converting the values P(1), P(A), P(B) and P(C) applied to its address inputs to an output variable b according to the expression:

$$b = P(1)/[P(A) + P(B) + P(C) + K(1)],$$

where $K(1)$ is a singularity preventing constant.

It will therefore be seen that the variable b directly reflects the degree to which the coefficient block is characterized by the boundary characteristic. That is, variable b increases as the ratio of $P(1)$ to $[P(A) + P(B) + P(C) + K(1)]$ increases and decreases as the ratio decreases. The variable b is next applied as an address input to a second memory in the form of a RAM 136 for deriving the boundary characteristic value mb. RAM 136 simulates a piece-wise linear curve 138 for converting variable b to boundary characteristic value mb. Boundary characteristic mb thus assumes a value of 1.0 for values of variable b less than 1.0 (i.e. indicating that the coefficient block is characterized by a relatively small degree of the boundary characteristic), a value of 0.9 for values of variable b greater than a threshold value $b_2$ (i.e. indicating that the coefficient block is characterized by a relatively large degree of the boundary characteristic) and a value continuously decreasing from 1.0 to 0.9 with a slope of about 0.013 for values of variable b between 1.0 and $b_2$. The effect of this transformation is that boundary characteristic value mb inversely reflects the degree to which the coefficient block is characterized by the boundary characteristic, a value of 1.0 indicating a relatively small degree of the boundary characteristic and a value of 0.9 indicating a relatively large degree.

The degree to which the coefficient block is characterized by the low AC, edge and texture characteristics is determined in a generally similar manner. More specifically, the P(1), P(2) and P(3) values from sort unit 116 are each coupled to a low AC LUT 140 which provides a low AC characteristic value ml, an edge LUT 150 which provides an edge characteristic value me and a texture LUT 160 which provides a texture characteristic value mt.

Figure 6:
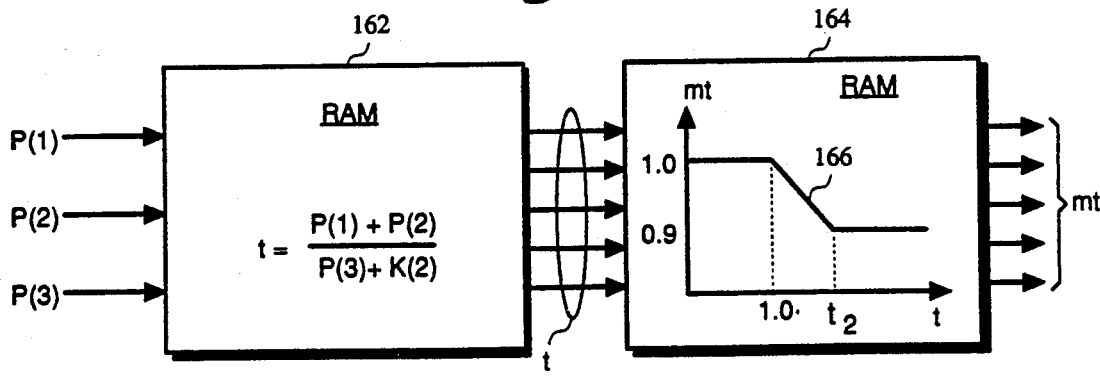

LUT 160, which is shown in FIG. 6, comprises a first RAM 162 for converting the P(1), P(2) and P(3) values supplied to its address inputs to an output variable t according to the expression:

$$t = [P(1) + P(2)]/[P(3) + K(2)],$$

where $K(2)$ is a programmable constant.

The magnitude of variable t thus directly reflects the degree to which the coefficient block is characterized by the texture characteristic. The variable t is applied as an address input to a second RAM 164 for deriving the texture characteristic value mt. RAM 164 simulates a piece-wise linear curve 166 for converting variable t to texture characteristic value mt. Texture characteristic value mt thus assumes a value of 1.0 for values of variable t less than 1.0, a value of 0.9 for values of variable t greater than a threshold value $t_2$ and a value continuously decreasing from 1.0 to 0.9 with a slope of about 0.025 for values of variable t between 1.0 and $t_2$. Thus, as in the case of boundary characteristic value mb, texture characteristic value mt inversely reflects the degree to which the coefficient block is characterized by the texture characteristic.

Figure 7:
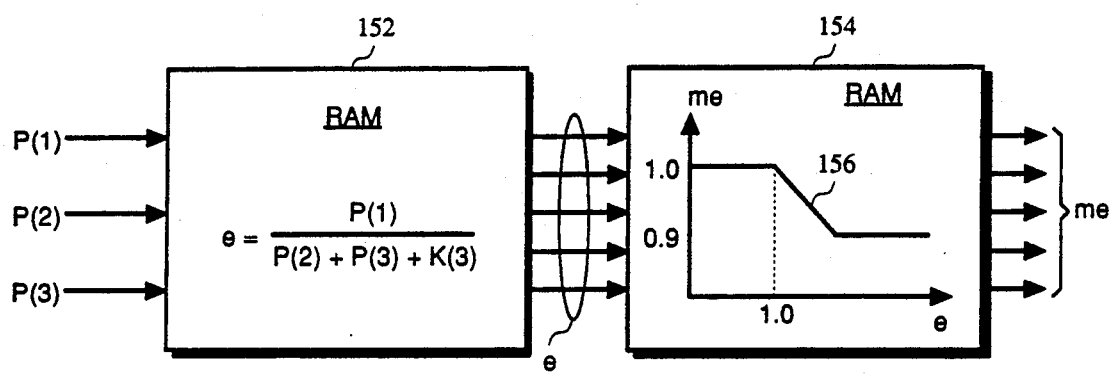
Figure 8:
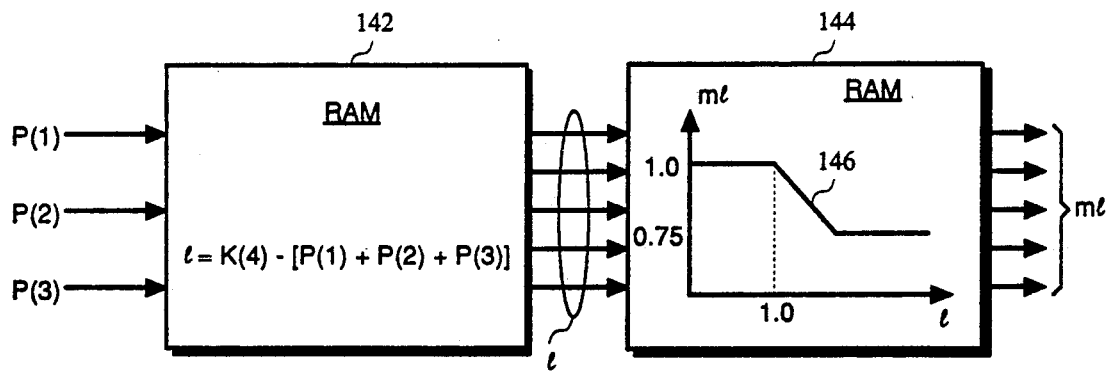

LUT's 150 and 140, shown respectively in FIGS. 7 and 8, similarly transform values P(1), P(2) and P(3) into the edge and low AC characteristic values me and ml. LUT 150 comprises a first RAM 152 for converting values P(1), P(2) and P(3) to a variable e according to the expression:

$$e = P(1)/[P(2) + P(3) + K(3)].$$

Variable e is then converted to edge characteristic value me in a second RAM 154 which simulates a piece-wise linear curve 156, which includes a central segment having a slope of about $-0.013$.

LUT 140 comprises a first RAM 142 for converting values P(1), P(2) and P(3) to a variable l according to the expression:

$$l = K(4) - [P(1) + P(2) + P(3)].$$

Variable l is then converted to low AC characteristic value ml in a second RAM 144 which simulates a piece-wise linear curve 146, which includes a central segment having a slope of about $-0.018$. It will be understood that in any of the foregoing LUT's, the functions of the first and second RAM's could be combined for execution in a single memory.

The perceptual characteristic values mb, mt, me and ml generated by LUT's 132, 160, 150 and 140 are combined in a modification factor LUT 170 to provide a single perceptual value $m_o$ representing the coefficient block. In a preferred embodiment of the invention the combined perceptual value $m_o$, which includes contributions from each of the perceptual characteristic values mb, mt, me and ml, is derived by LUT 170 according to the expression:

$$m_o = (1 - Km) * (mb * me * mt + Km) * ml,$$

where Km is a constant preferably equal to about 0.25.

The combined perceptual value $m_o$ provides a preliminary indication of the quantization level to be employed by quantizers 14 and 38. That is, value $m_o$ provides a measure of the masking afforded by a particular coefficient block and thus the degree of quantization which can be tolerated before excessive artifacts are produced in the reproduced image. Larger values of $m_o$ represent increased masking such that larger errors in the transmitted data can be tolerated allowing for decreased levels of quantization. On the other hand, smaller values of $m_o$ represent decreased masking in which case less errors can be tolerated requiring the use of increased quantization levels.

The perceptual value $m_o$ is coupled to a series of multipliers 172, 174 and 176 for adjusting the preliminary quantization level represented thereby according to the fullness of the output buffer 18 or 48 and the regional energy estimations P(H), P(V) and P(D). In particular, the regional energy estimations P(H), P(V) and P(D) are coupled from power estimation unit 108 to the first inputs of three respective comparators 180, 182 and 184. The second input of each comparator is supplied with the fullness signal from the output buffer. Each of the comparators 180, 182 and 184 determines the maximum input signal associated therewith and provides that signal at its output. Thus, the output of each comparator comprises the largest of either the fullness signal or the associated regional energy estimation P(H), P(V) or P(D). The three outputs of the comparators are applied to a weighting unit 186 which weights the maximum of the three comparator outputs with a weighting factor of 1.0, the minimum with a weighting factor of 2.0 and the middle value with a weighting factor of 1.5. The weighting factor (1.0, 1.5 or 2.0) derived for the output of comparator 180 comprises a horizontal weighting factor $W_h$ and is applied to the second input of multiplier 172, the weighting factor derived for the output of comparator 182 comprising a vertical weighting factor $W_v$ which is applied to the second input of multiplier 174 and the weighting factor derived for the output of comparator 184 comprising a diagonal weighting factor which is applied to the second input of multiplier 176.

In accordance with the foregoing, the outputs of multipliers 172, 174 and 176 comprise the products of perceptual value $m_o$ and the respective weighting factors $W_h$, $W_v$ and $W_d$. The products $m_oW_h$, $m_oW_v$ and $m_oW_d$ are then applied to the inputs of a demultiplexer 190 which provides a serial signal at its output comprising 14 time-intervals of product $m_oW_h$ corresponding to the coefficients of spatial region H, followed by 14 intervals of product $m_oW_v$ corresponding to the coefficients of spatial region V and finally followed by 37 time intervals of product $m_oW_d$ corresponding to the coefficients of spatial region D. In this manner, ignoring the effect of the buffer fullness signal for the moment, the coefficients applied to quantizer 14 or 38 in the spatial region H, V or D having the largest energy estimation are selected for processing with the largest degree of quantization, the coefficients having the next largest energy estimation for processing with a smaller degree of quantization and the coefficients having the smallest energy estimation for processing with the lowest level of quantization. These quantization level selections may further be modified in accordance with a series of static weights stored in a memory 192. This modification is effected by multiplying each of the 64 serial product signals from demultiplexer 190 with a corresponding static weighting factor read from memory 192 in a multiplier 194. The output of multiplier 194 thus comprises 64 spatially related and statically modified quantization control signals for separately controlling the level of quantization used to encode each spatially corresponding coefficient applied to quantizer 14 or 38. That is, the statically modified $m_oW_h$ products control the quantization of the applied coefficients in the H spatial region, the $m_oW_v$ products the quantization of the coefficients in the V region and the $m_oW_d$ products the coefficients in the D region.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims and viewed in their proper perspective based on the prior art.

What is claimed is:

1. A method of modeling a signal, representing a video image comprising the steps of:
    deriving a plurality of groups of spectral coefficients each representing a respective spatial portion of said video image;
    separating the coefficients of each of said groups into a plurality of subgroups, the coefficients of each of said subgroups representing a series of spatially related frequencies occurring in a selected direction;
    estimating the energy characterizing each of said subgroups;
    deriving from the subgroup energy estimations of each of said groups a plurality of values each representing the degree to which the corresponding portion of said video image is characterized by a respective image related perceptual characteristic; and
    combining said plurality of values to provide an output value corresponding to each of said groups of coefficients.

2. A method of modeling a signal representing a video image comprising the steps of:
    deriving a plurality of groups of spectral coefficients each representing a respective spatial portion of said video image;
    separating the coefficients of each of said groups into a plurality of subgroups, the coefficients of each of said subgroups representing a series of spatially related frequencies occurring in a selected direction;
    deriving from the subgroups of each of said groups of coefficients a plurality of values each representing the degree to which the corresponding portion of said video image is characterized by a respective image related perceptual characteristic; and
    combining said plurality of values to provide an output value corresponding to each of said groups of coefficients.

3. The method of claim 2 wherein said step of deriving said plurality of values comprises estimating the energy characterizing each of said subgroups and sorting said energy estimations according to magnitude.

4. The method of claim 3 including deriving at least one of said values for a current coefficient group as a function of the subgroup energy estimations of a plurality of coefficient groups in the immediate vicinity of said current group.

5. The method of claim 4 wherein said at least one value is derived as a function of the largest energy estimation characterizing the subgroups of said current group and the energy estimations of the corresponding subgroups of a plurality of coefficient groups in the immediate vicinity of said current group.

6. The method of claim 3 wherein a first of said values is derived by processing said subgroup energy estimations for determining the degree to which the portion of said video image corresponding to each of said coefficient groups comprises a boundary between distinct portions of said video image.

7. The method of claim 3 wherein a second of said values is derived by processing said subgroup energy estimations for determining the degree to which each of said coefficient groups is characterized by energy primarily in one of said subgroups.

8. The method of claim 3 wherein a third of said values is derived by processing said subgroup energy estimations for determining the degree to which each of said coefficient groups is characterized by energy primarily in two of said subgroups.

9. The method of claim 3 wherein a fourth of said values is derived by processing said subgroup energy estimations for determining the degree to which each of said coefficient groups is characterized primarily by low-level AC energy.

10. The method of claim 2 including employing a piece-wise linear model to derive at least one of said values.

11. The method of claim 2 including providing at least one of said values at a first constant level for magnitudes thereof less than a first threshold level and at a second constant level for magnitudes thereof greater than a second threshold level.

12. The method of claim 11 including providing said at least one value as a function which varies between said first and second constant levels for magnitudes thereof between said first and second threshold levels.

13. The method of claim 11 wherein said first constant level is greater than said second constant level.

14. The method of claim 3 including weighting said output value as a function of said subgroup energy estimations to provide a weighted output signal corresponding to each of said subgroups.

15. The method of claim 14 including combining said weighted output signals to provide a succession of weighted output values each related to a respective coefficient of the corresponding coefficient group.

16. A method of modeling a signal representing a video image, comprising the steps of:
deriving a plurality of groups of spectral coefficients each representing a respective spatial portion of said video image;
separating the coefficients of each of said groups into a plurality of subgroups, the coefficients of each of said subgroups representing a series of spatially related frequencies occurring in a selected direction;
estimating the energy characterizing each of said subgroups;
processing said subgroup energy estimations to derive a plurality of values each representing the degree to which the corresponding portion of said video image is characterized by a respective image related perceptual characteristic;
combining said plurality of values to provide an output value corresponding to each of said groups of coefficients;
weighting said output value as a function of said subgroup energy estimations to provide a weighted output signal corresponding to each of said subgroups; and
combining said weighted output signals to provide a succession of weighted output values each related to a respective coefficient of the corresponding coefficient group.

17. The method of claim 16 wherein a first of said values is derived by processing said subgroup energy estimations for determining the degree to which the portion of said video image corresponding to each of said coefficient groups comprises a boundary between distinct portions of said video image.

18. The method of claim 16 wherein a second of said values is derived by processing said subgroup energy estimations for determining the degree to which each of said coefficient groups is characterized by energy primarily in one of said subgroups.

19. The method of claim 16 wherein a third of said values is derived by processing said subgroup energy estimations for determining the degree to which each of said coefficient groups is characterized by energy primarily in two of said subgroups.

20. The method of claim 16 wherein a fourth of said values is derived by processing said subgroup energy estimations for determining the degree to which each of said coefficient groups is characterized primarily by low-level AC energy.

21. The method of claim 16 including providing at least one of said values at a first constant level for magnitudes thereof less than a first threshold level and at a second constant level for magnitudes thereof greater than a second threshold level.

22. The method of claim 21 including providing said at least one value as a function which varies between said first and second constant levels for magnitudes thereof between said first and second threshold levels.

23. The method of claim 22 wherein said first constant level is greater than said second constant level.

* * * * *